(12) United States Patent
Segev et al.

(10) Patent No.: US 12,327,137 B2
(45) Date of Patent: Jun. 10, 2025

(54) INSTANT SUBMISSION QUEUE RELEASE

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 547 days.

(21) Appl. No.: 17/654,528

(22) Filed: Mar. 11, 2022

(65) Prior Publication Data
US 2023/0289226 A1    Sep. 14, 2023

(51) Int. Cl.
*G06F 9/50* (2006.01)
*G06F 9/448* (2018.01)
*G06F 9/54* (2006.01)
*G06F 11/07* (2006.01)
*G06F 11/30* (2006.01)
*G06F 13/16* (2006.01)
*G06F 13/42* (2006.01)

(52) U.S. Cl.
CPC .......... *G06F 9/5016* (2013.01); *G06F 9/4498* (2018.02); *G06F 9/5022* (2013.01); *G06F 9/546* (2013.01); *G06F 11/0772* (2013.01); *G06F 11/3027* (2013.01); *G06F 13/1668* (2013.01); *G06F 13/4221* (2013.01)

(58) Field of Classification Search
CPC .................................................... G06F 9/5016
See application file for complete search history.

(56) References Cited

U.S. PATENT DOCUMENTS

| | | | |
|---|---|---|---|
| 8,495,202 B2 * | 7/2013 | Kawai | G06F 3/1229 709/224 |
| 9,052,835 B1 | 6/2015 | Darrington et al. | |
| 10,019,181 B2 | 7/2018 | Singh et al. | |
| 10,282,103 B1 | 5/2019 | Stone et al. | |
| 2019/0205059 A1 | 7/2019 | Cho | |
| 2021/0182219 A1 | 6/2021 | Benisty | |

* cited by examiner

*Primary Examiner* — Charlie Sun
(74) *Attorney, Agent, or Firm* — PATTERSON + SHERIDAN, LLP

(57) ABSTRACT

A data storage device includes a memory device and a controller coupled to the memory device. The controller is configured to receive a shutdown notification, fetch one or more command identifiers from a submission queue of a host device, generate error indications for the one or more command identifiers, and send a completion message, including the generated error indication, for each of the one or more command identifiers to the host device. The controller is further configured to push non-processed pending commands to a completion finite state machine, where the controller generates an error indication for each of the non-processed pending commands and sends a completion message, including the generated error indication, for each of the non-processed pending commands to the host device. While the controller is fetching command identifiers and pushing non-process commands, the controller is configured to continue processing processed commands in parallel.

10 Claims, 7 Drawing Sheets

INSTANT SUBMISSION QUEUE RELEASE

BACKGROUND OF THE DISCLOSURE

Field of the Disclosure

Embodiments of the present disclosure generally relate to data storage devices, such as solid state drives (SSDs), and, more specifically, improved de-allocation of resources for uncompleted commands.

Description of the Related Art

There are many occasions where commands from any or all submission queues may be required to be aborted. For example, the occasions may include a power down, a graceful reset, an ungraceful reset, a fatal error, a delete submission queue command, a security breach, and the like. When a data storage device receives a power down (i.e., shutdown) indication, a controller of the data storage device may store any relevant tables and cached writes that are located in a data pipe or volatile memory into a non-volatile memory, such that the data (e.g., tables and cached writes) may be recovered when power returns to the data storage device. However, when a shutdown is received, there may be commands still pending in the data path of the controller. In order to reduce the amount of time for the data storage device to power down, the pending commands may be completed with an error indication, such as "aborted due to power loss notification".

Furthermore, there may be commands still residing in submission queues of the host device even though the host device may have already stopped generating commands due to the power down request. Because the pending commands in the submission queues of the host device are already generated, the host device has already allocated regions in its dynamic random access memory (DRAM) for the respective data and the respective physical region page (PRP)/scatter gather list (SGL) entries. The resources allocated for the pending commands in the submission queues may be stuck in limbo (i.e., cannot be de-allocated unless specifically done) until the data storage device powers on and fetches the pending commands.

Therefore, there is a need in the art for an improved de-allocation of resources during a data storage device shutdown event.

SUMMARY OF THE DISCLOSURE

The present disclosure generally relates to data storage devices, such as solid state drives (SSDs), and, more specifically, improved de-allocation of resources for uncompleted commands. A data storage device includes a memory device and a controller coupled to the memory device. The controller is configured to receive a shutdown notification, fetch one or more command identifiers from a submission queue of a host device, generate error indications for the one or more command identifiers, and send a completion message, including the generated error indication, for each of the one or more command identifiers to the host device. The controller is further configured to push non-processed pending commands to a completion finite state machine, where the controller generates an error indication for each of the non-processed pending commands and sends a completion message, including the generated error indication, for each of the non-processed pending commands to the host device. While the controller is fetching command identifiers and pushing non-process commands, the controller is configured to continue processing processed commands in parallel.

In one embodiment, a data storage device includes a memory device and a controller coupled to the memory device. The controller is configured to receive a shutdown notification, fetch one or more command identifiers from a submission queue, where each command identifier is associated with a command located in the submission queue, and send a completion message with an error indication for each of the one or more command identifiers to a completion queue.

In another embodiment, a data storage device includes a memory device and a controller coupled to the memory device. The controller includes a PCIe interface, a control path coupled to the PCIe interface, where the control path is configured to fetch one or more command identifiers from a submission queue, wherein each command identifier is associated with a command located in the submission queue, a data path coupled to the memory device, the control path, and the PCIe interface, and a multiplexer (mux) coupled to the control path and the data path, where the controller is configured to send a completion message with an error indication for each of the one or more command identifiers to a completion queue.

In another embodiment, a data storage device includes memory means and a controller coupled to the memory means. The controller is configured to fetch a command identifier of a pending command in a submission queue, where the fetching is in response to a shutdown notification, and where data of the pending command is not fetched, and generate and send an error indication for the pending command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improved de-allocation of resources for uncompleted commands. A data storage device includes a memory device and a controller coupled to the memory device. The controller is configured to receive a shutdown notification, fetch one or more command identifiers from a submission queue of a host device, generate error indications for the one or more command identifiers, and send a completion message, including the generated error indication, for each of the one or more command identifiers to the host device. The controller is further configured to push non-processed pending commands to a completion finite state machine, where the controller generates an error indication for each of the non-processed pending commands and sends a completion message, including the generated error indication, for each of the non-processed pending commands to the host device. While the controller is fetching command identifiers and pushing non-process commands, the controller is configured to continue processing processed commands in parallel.

Figure 1:
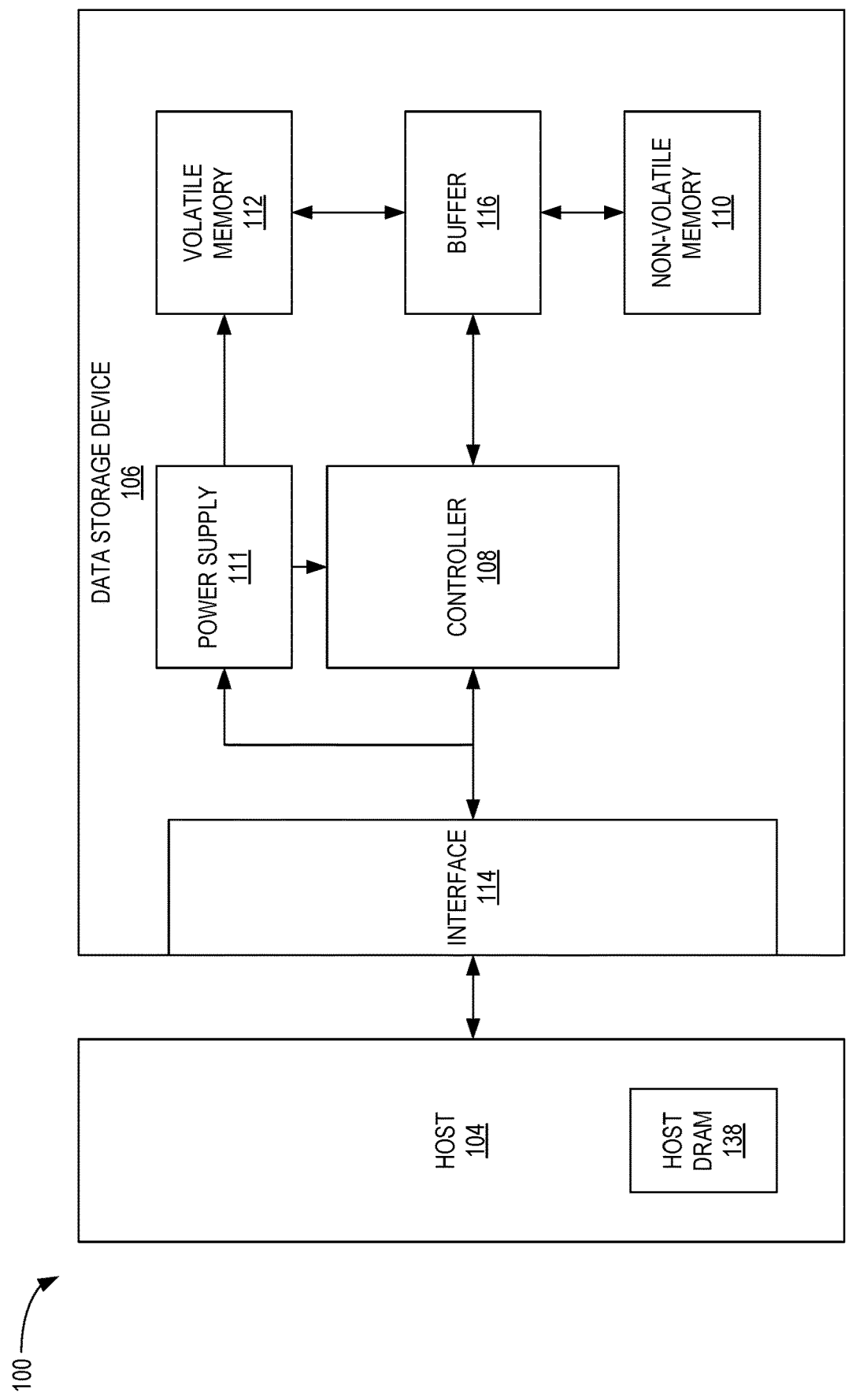
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
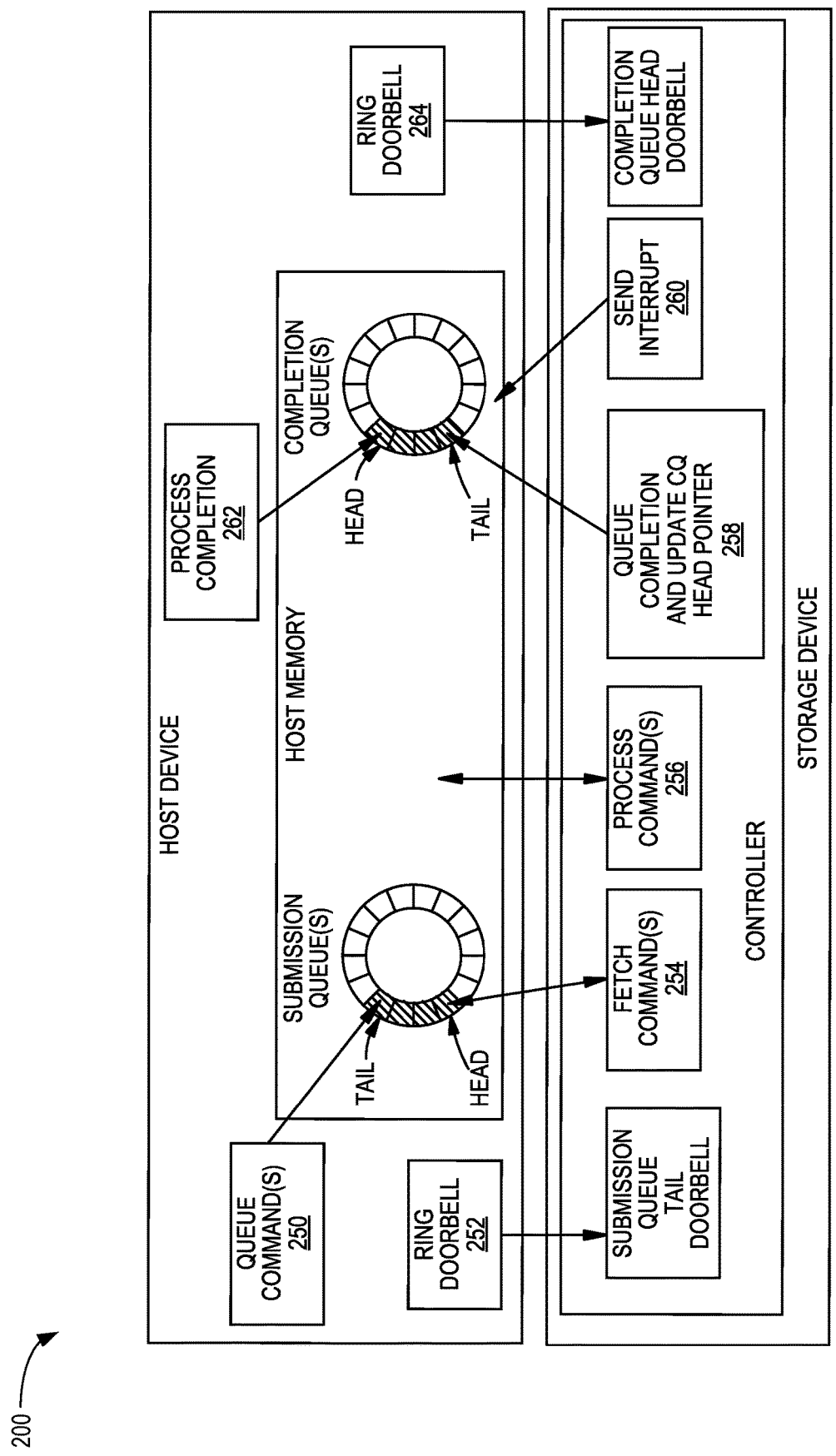
FIG. 2 is a block diagram illustrating a method of operating a storage device to execute a read or write command, according to certain embodiments.

FIG. 2 is a block diagram illustrating a method 200 of operating a storage device to execute a read or write command, according to one embodiment. Method 200 may be used with the storage system 100 of FIG. 1 having the host device 104 and the data storage device 106, where the data storage device includes the controller 108.

Method 200 begins at operation 250, where the host device writes a command into a submission queue (SQ) as an entry. The host device may write one or more commands into the submission queue at operation 250. The commands may be read commands or write commands. The host device may comprise one or more submission queues.

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
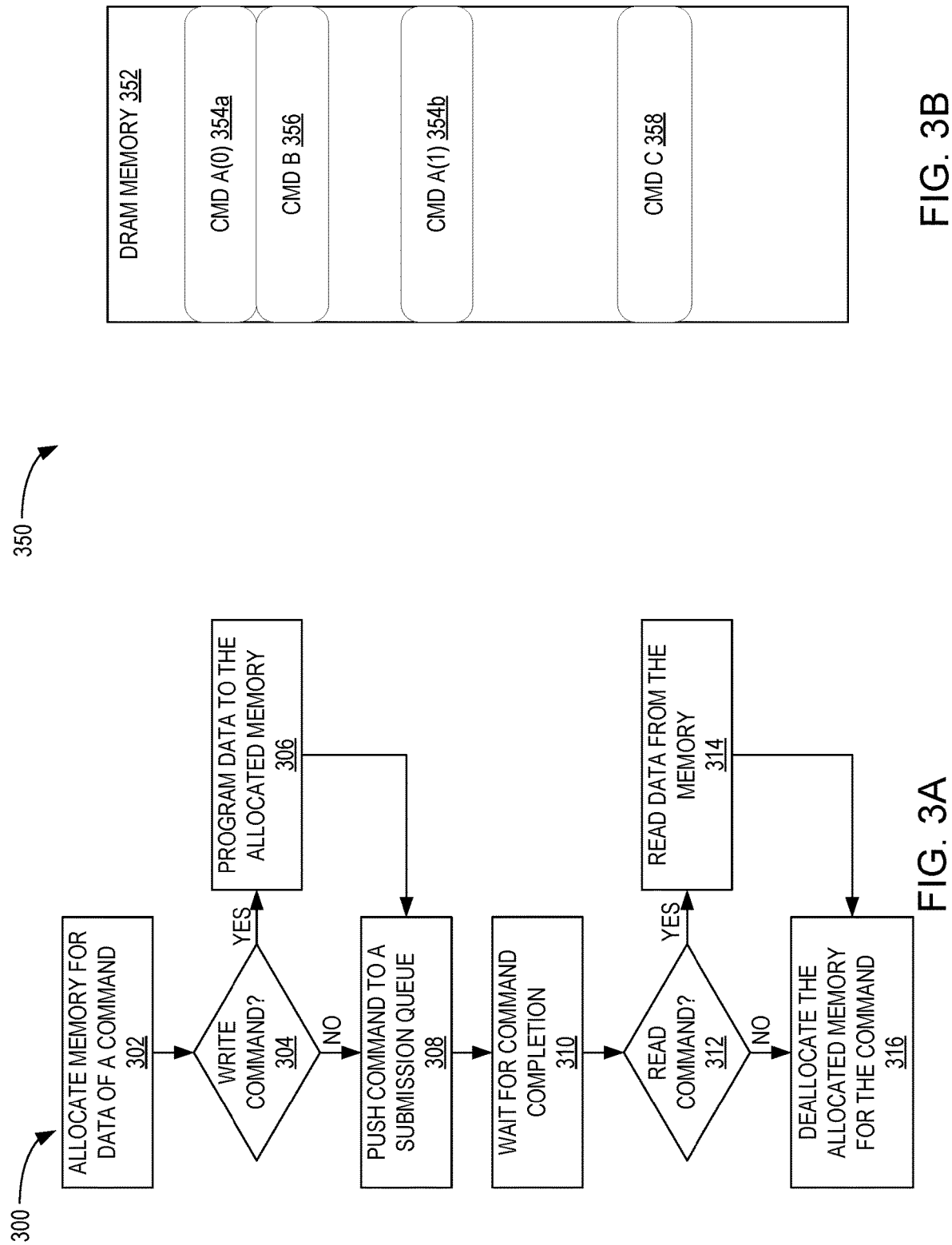
FIG. 3A is a flow diagram illustrating a method of deallocating allocated memory for a command by a host device, according to certain embodiments.
FIG. 3B is an illustration of a DRAM memory in accordance to the method of FIG. 3A, according to certain embodiments.

FIG. 3A is a flow diagram illustrating a method 300 of deallocating allocated memory, such as in the host DRAM 138 of FIG. 1, for a command by a host device, such as the host device 104 of FIG. 1, according to certain embodiments.

At block 302, the host device 104 allocates memory for data for a generated command. At block 304, the host device determines if the generated command is a write command. If the generated command is a write command at block 304, the host device 104 programs the data to the allocated memory at block 306. However, if the generated command is not a write command at block 304 or after the data is programmed to the allocated memory at block 306, then the host device 104 pushes the command to a submission queue at block 308. For example, the submission queue may be part of the host DRAM 138.

At block 310, the host device 104 waits for the command to be finished and the relevant data to be placed in the host DRAM 138. At block 312, the host device determines if the command is a read command. If the command is a read command at block 312, then the host device 104 reads the data from the host DRAM 138 at block 314. However, if the command is not a read command at block 312 or after the data is read from the host DRAM 138 at block 314, then the host device 104 deallocates the allocated memory for the command at block 316.

FIG. 3B is an illustration of a DRAM memory 352 in accordance to method 300 of FIG. 3A, according to certain embodiments. The DRAM memory 352 includes three commands, Command A 354, Command B 356, and Command C 358. The three commands have not yet been completed, thus, the corresponding allocated memory has not been de-allocated yet. Command A 354 spans across two memory ranges of the DRAM memory 352, such that Command A 354 includes a first portion 354a and a second portion 354b, where the first portion 354a and the second portion 354b are collectively referred to as Command A 354 for exemplary purposes. Each of the three commands may be directed towards a data storage device, such as the data storage device 106 of FIG. 1.

After shutdown of the host device 104, Command A 354, Command B 356, and Command C 358 each has memory allocated from the DRAM memory 352 for each of the commands. In order to release the allocated memory from the DRAM memory 352, the host device 104 may need to scan the submission queue in order to determine the relevant allocated memory to associated with the pending commands in the submission queue to be released. Thus, the shutdown operation of the host device 104 may be prolonged by the scanning and the de-allocation of the allocated memory of the DRAM memory 352.

Figure 4:
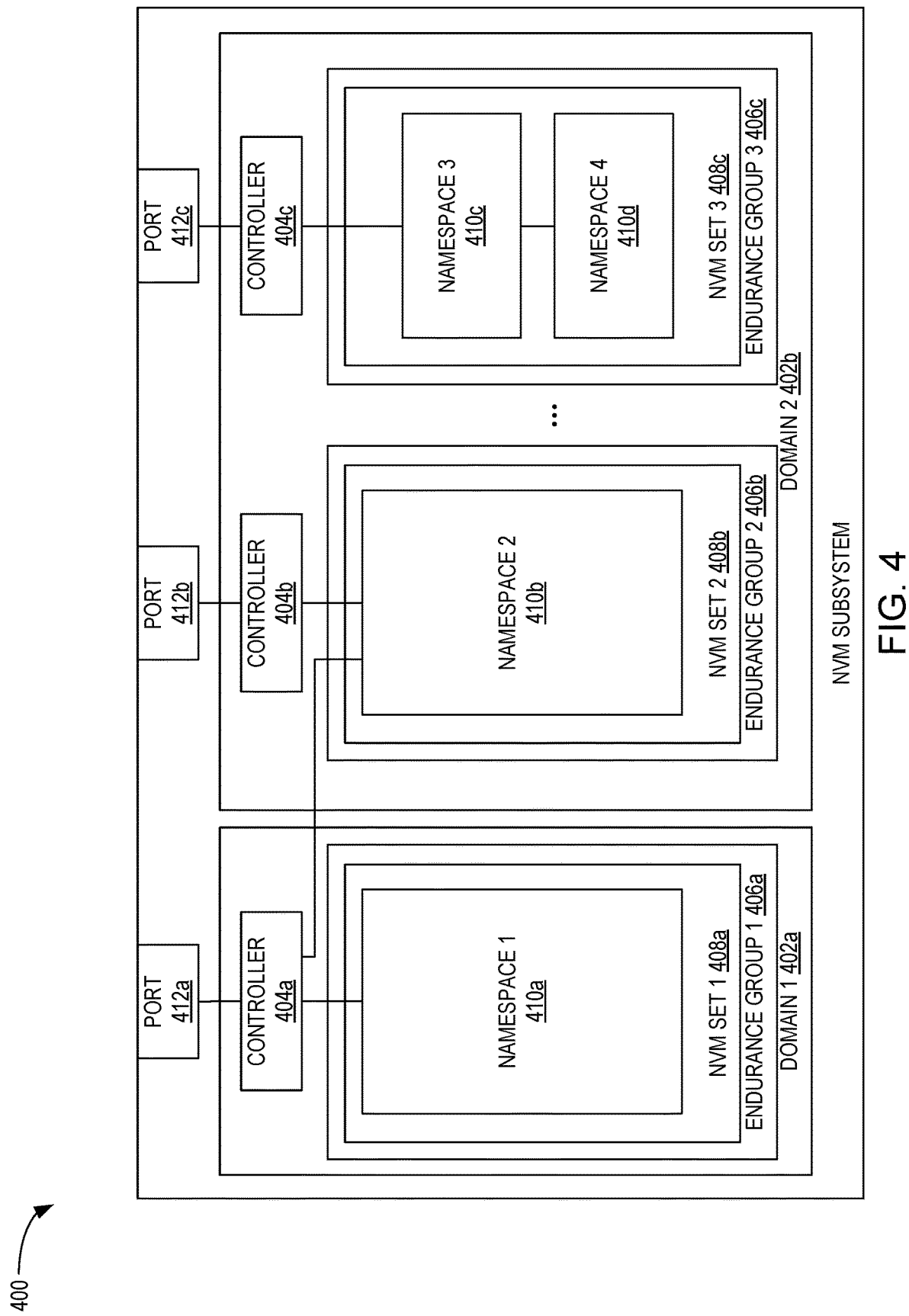
FIG. 4 is an illustration of a NVM subsystem, according to certain embodiments.

FIG. 4 is an illustration of a NVM subsystem 400, according to certain embodiments. It is to be understood that the illustrated elements of the NVM subsystem 400 is not intended to be limiting. The NVM subsystem 400 includes a first domain 402a, a second domain 402b, a first port 412a, a second port 412b, and a third port 412c. The first domain 402a includes a first endurance group 406a and a first controller 404a coupled to the first port 412a and the second domain 402b includes a second endurance group 406b, a second controller 404b coupled to the second port 412b, a third endurance group 406c, and a third controller 404c coupled to the third port 412c. The first endurance group 406a includes a first NVM set 408a, where the first NVM set 408a includes a first namespace 410a. The second endurance group 406b includes a second NVM set 408b, where the second NVM set 408b includes a second namespace 410b. The third endurance group 406c includes a third NVM set 408c, where the third NVM set 408c includes a third namespace 410c and a fourth namespace 410d. The first namespace 410a and the second namespace 410b are coupled to the first controller 404a. The second namespace 410b is further coupled to the second controller 404b. The third namespace 410c and the fourth namespace 410d are coupled to the third controller 404c.

In the example of the NVM subsystem 400, if the second domain 402b undergoes a shutdown, then the first domain 402a is also impacted. In other words, the second controller 404b may not be allowed to indicate that the second endurance group 406b is ready for shutdown until all commands associated with the second endurance group 406b directed to the first controller 404a are completed. Therefore, in order for the second domain 402b to be shutdown, the first controller 404a needs to complete the commands, including the pending commands, associated with the second endurance group 406b.

Figure 5:
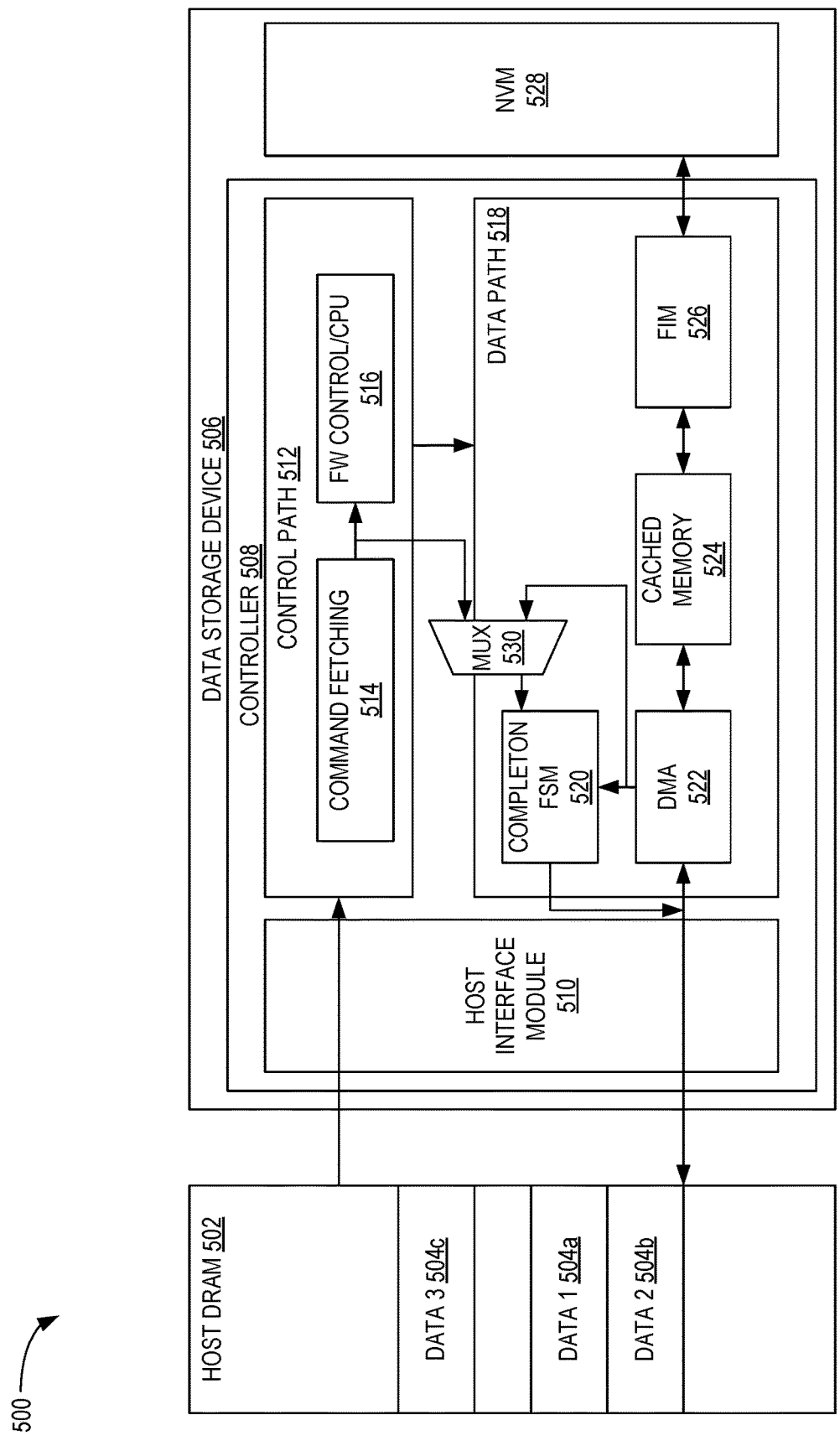
FIG. 5 is a schematic block diagram illustrating a storage system in which a data storage device may function as a storage device for a host device, according to certain embodiments.

FIG. 5 is a schematic block diagram illustrating a storage system 500 in which a data storage device 506 may function as a storage device for a host device, which may be the host device 104 of FIG. 1, according to certain embodiments. Host DRAM 502 may be the host DRAM 138 of FIG. 1. The host DRAM 502 includes first data 504a, second data 504b, and third data 504c. It is to be further understood that the first data 504a is associated with a first command, the second data 504b is associated with a second command, and the third data 504c is associated with a third command.

The data storage device 506 includes a controller 508 and an NVM 528. The controller 508 includes a host interface module (HIM) 510, a control path 512, data path 518, and a multiplexer (mux) 530. The HIM 510 may be a PCIe interface. The mux 530 may be part of the data path 518 or separate from the data path 518. Data and commands are fetched or received from the host DRAM 502 by the HIM 510. The commands associated with the data are passed to the control path 512, where the control path 512 processes the commands. The control path 512 includes a command fetching unit 514 and a firmware (FW) control/central processing unit (CPU) 516. The commands are fetched by the command fetching unit 514 and passed to the FW control/CPU 516, where the FW/CPU 516 is configured to prepare the system, by allocating local memory, such as in cached memory 524, generating instructions for the data path 518, and triggering the data path 518.

Likewise, data received or fetched from the host DRAM 502 is passed to the data path 518. The data path 518 includes a completion finite state machine (FSM) 520, a direct memory access (DMA) 522, the cached memory 524, and a flash interface module (FIM) 526. The DMA 522 is configured to read the data from the host DRAM 502. The data is stored in the cached memory 524 until the FIM 526 programs the data to the NVM 528. The completion FSM 520 generates completion messages for commands whose entire data has been transferred over the HIM 510 from the host DRAM 502.

The mux 530 allows for fetched commands to be directly sent to the completion queue. For example, during a shutdown operation, pending commands that have not yet been processed may be sent to the mux 530, where the completion FSM 520 generates completion messages for the pending commands. Because the pending commands have not yet been executed or processed, the completion messages may include an error indication to indicate that the associated completed command has not actually been completed. While data and local tables is programmed to the NVM 528 during a shutdown operation, the command fetching unit 514, the completion FSM 520, and the HIM 510 may work autonomously and in parallel to the programming of the data and local tables to the NVM 528 to fetch and complete submitted commands with an error indication.

For example, if a command has been fetched by the command fetching unit 514, then the command may be sent to the mux 530 if the FW control/CPU 516 has not processed the command when a shutdown indication is received. In another example, the command fetching unit 514 may fetch a command identifier for pending commands located in the host DRAM 502. For example, the first data 504a may include a command identifier. The command fetching unit 514 may fetch the command identifier associated with the first data 504a from the host DRAM 502 and pass the command identifier to the completion FSM 520 through the mux 530. The completion FSM 520 generates a completion message associated with the fetched command identifier, where the completion message includes an error indication. The error indication indicates that the command associated with the completion messaged has not yet been completed or has not been completed successfully. However, because the completion message has been sent to the host device 104, the host device 104 may deallocate the memory allocated to the relevant commands and data from the host DRAM 502. Thus, the host device 104 may, during this time, release one or more physical region pages (PRPs) associated with the completion messages before receiving a "ready for shutdown" indication from the controller 508.

Figures 6, 7:
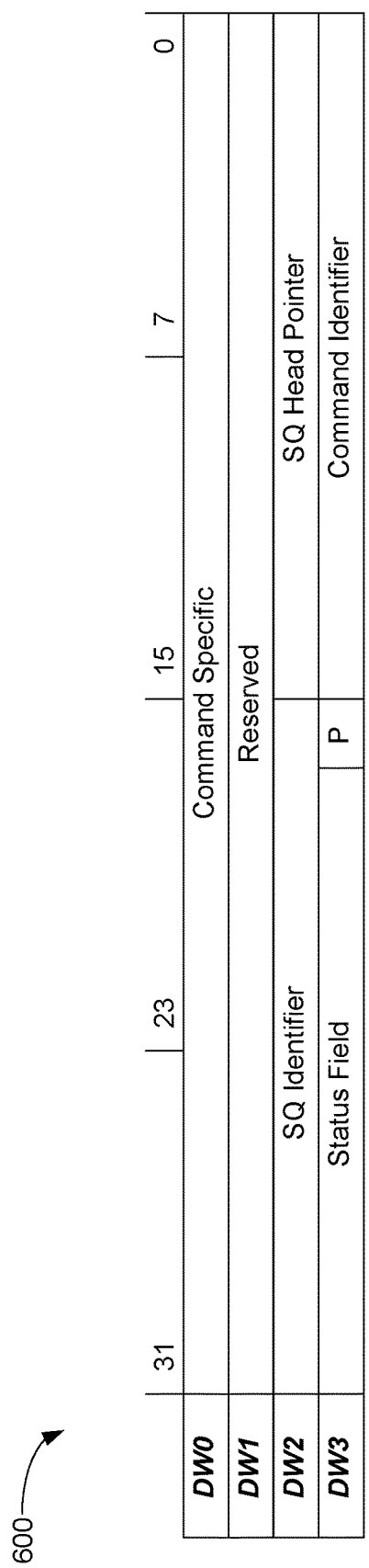
FIG. 6 is an example of a completion entry, according to certain embodiments.
FIG. 7 is an example of a part of a command DWORD, according to certain embodiments.

FIG. 6 is an example of a completion entry 600, according to certain embodiments. The completion entry 600 may be part of a completion message sent to a host device, such as the host device 104 of FIG. 1, from a controller, such as the controller 508 of FIG. 5. The completion entry 600 includes several fields, such as a DW0 field, which may be command specific, a DW1 field, which is reserved, a DW2 field, which includes a submission queue (SQ) identifier and a SQ head pointer, and a DW3 field, which includes a status field and a command identifier field. The command identifier field may indicate which command from the submission queue that the completion entry is associated. Thus, the host device 104 may determine which commands may be released from the submission queue in order to deallocate the associated memory resources. Furthermore, the command identifier may include an error indication or, in other examples, the status field may indicate an error indication, such that the error indication indicates that the relevant command has been aborted due to a power loss notification.

FIG. 7 is an example of a part of a command DWORD 0 (DW0) 700, according to certain embodiments. In order to optimize a fast release of the submission queue, a controller, such as the controller 108 of FIG. 1, or a command fetching unit, such as the command fetching unit 514 of FIG. 5, may fetch the relevant DW of each command. The command DW 700 may be the DW3 of FIG. 6, where the DW3 includes a command identifier. Thus, a completion FSM, such as the completion FSM 520 of FIG. 5, may generate a completion message using the fetched relevant DW of the command (i.e., the DW including the command identifier), where the completion message includes an error indication indicating that the relevant command has been aborted due to a power loss notification.

Figure 8:
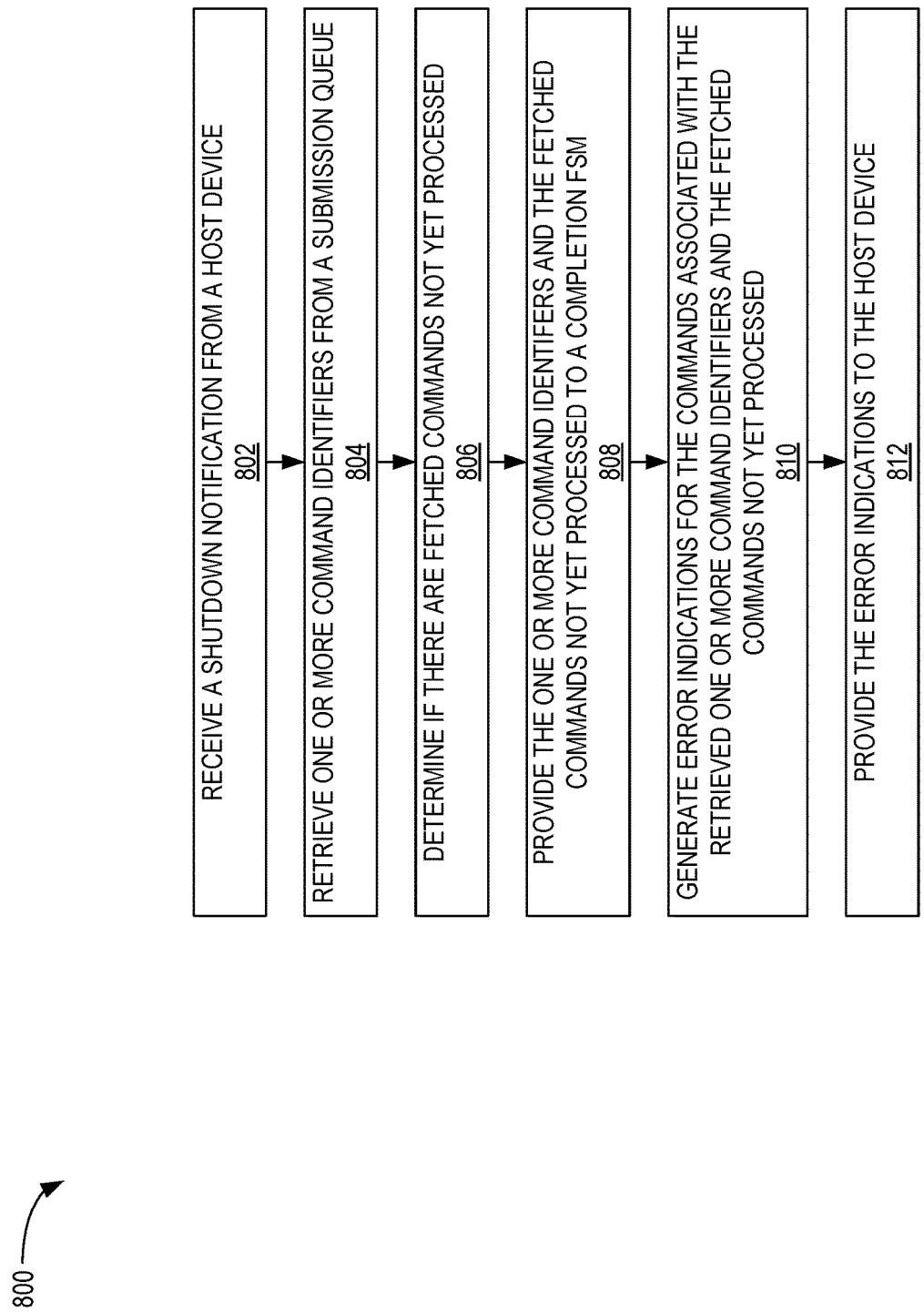
FIG. 8 is a flow diagram illustrating a method of deallocating allocated memory for a command by a data storage device, according to certain embodiments.

FIG. 8 is a flow diagram illustrating a method 800 of deallocating allocated memory for a command by a data storage device, such as the data storage device 106 of FIG. 1 or the data storage device 506 of FIG. 5, according to certain embodiments. Thus, aspects of the storage system 100 of FIG. 1 or the storage system 500 of FIG. 5 may be referenced herein for exemplary purposes. For example, method 800 may be implemented by the controller 108 or the controller 508.

At block 802, the controller 508 receives a shutdown notification from the host device 104. In one example, the shutdown notification may be controller 508 generated, such as when the data storage device experiences a failure and needs to be rebooted. In other examples, the shutdown notification may indicate a shutdown between a connection between the host device 104 and the data storage device 106, 506. It is to be understood that the use of "shutdown" and "shutdown notification" in the description hereinbefore and hereinafter is not intended to be limiting. For example, use of "shutdown" and "shutdown notification" hereinafter and hereinbefore may refer to a sanitization operation, a deletion operation, a security fix operation, a reset operation, a format operation, and the like for a submission queue, a virtual function, or a physical function.

In one embodiment, the shutdown notification may be per virtual function or physical function. For example, when the host device 104 determines that a submission queue is not relevant, such as when there is a security issue with the submission queue, the submission queue may be isolated from the storage system 500 and the associated commands may be aborted, where aborting comprises the controller 108, 508 or the command fetching unit 514 fetching the relevant command identifiers from the aborted submission queue. In another example, a submission queue may become not relevant when there is a sanitize command for the submission queue, an NVM format command for the submission queue, a delete SQ command for the submission queue, a reset command for the submission queue, an internal error condition for the submission queue, and the like. Thus, the shutdown notification may be received for each of the submission queues or less than all of the submission queues.

At block 804, the controller 108, 508 or the command fetching unit 514 fetches one or more command identifiers from a submission queue (or a command queue) of the host DRAM 138, 502. For example, controller 108, 508 or the command fetching unit 514 may fetch each command identifier for each of the pending commands in the submission queue or fetch up to a threshold number of command identifiers, where the threshold number corresponds to an amount of commands that can be processed (i.e., sent to the completion FSM 520, where the completion FSM 520 generates a completion message with an error indication for the command) before a timeout occurs. The timeout may be a maximum amount of time after receiving the shutdown notification, where reaching the timeout indicates that the data storage device 106, 506 will be shutdown.

At block 806, the controller 108, 508 determines if there are fetched commands not yet processed, such as by the FW control/CPU 516. At block 808, the control path 512 passes the fetched commands not yet processed and the fetched command identifiers to the mux 530, where the mux 503 provides the fetched commands not yet processed and the fetched command identifiers to the completion FSM 520. At block 810, the completion FSM 520 generates completion messages with error indications for the commands associated with the retrieved one or more command identifiers and the fetched commands not yet processed. The error indications generated by the completion FSM 520 associated with the fetched commands not yet processed (first error indications) may be similar to the error indications generated by the completion FSM 520 for the retrieved one or more command identifiers (second error indications). It is to be understood that "similar" may refer to the same or essentially the same. For example, if the host device receives both the first error indications and the second error indications, the host device may not be able to differentiate between the first error indications and the second error indications. In other words, the host device may acknowledge a same error message indicating that the command associated with the error indication has not yet been completed regardless of whether the error indication was for a fetched command not yet processed or a retrieved command identifier.

At block 812, the controller 108, 508 provides the completion messages with the error indications to the host device 104 so that the host device 104 may deallocate allocated resources in the host DRAM 138, 502 allocated to the retrieved one or more command identifiers and the fetched commands not yet processed. In some examples, the completion FSM 520 may provide the completion messages with the error indications to the host device 104. The fetching of command identifiers and commands not yet completed and the sending of completion messages with an error indication may be applied per submission queue of the plurality of submission queues.

While method 800 is occurring, the controller 108, 508 may be programming data associated with processed commands, overhead data, and local tables to the NVM 528.

By fetching relevant command identifiers from a submission queue of a host device and generating completion messages with an error indication for the relevant command identifiers and commands not yet processed, the relevant submission queue may be cleared by the host device and host DRAM memory may be deallocated quicker. Thus, processes involving clearing a submission queue may occur quicker, which may improve system performance.

In one embodiment, a data storage device includes a memory device and a controller coupled to the memory device. The controller is configured to receive a shutdown notification, fetch one or more command identifiers from a submission queue, where each command identifier is associated with a command located in the submission queue, and send a completion message with an error indication for each of the one or more command identifiers to a completion queue.

The error indication indicates that commands associated the one or more command identifiers are not completed. The controller includes a multiplexer (mux) and a completion finite state machine (FSM). The completion FSM is configured to send the completion message to the completion queue. The controller further includes a PCIe interface and a command fetching unit. The PCIe interface, the completion FSM, and the command fetching unit operates autonomously to fetch and generate error indications for each command of the submission queue. The controller is further configured to program data to the memory device in parallel with the operating. The submission queue includes a plurality of submission queues. The shutdown notification is received for one or more of the plurality of submission queues. The fetching and the sending is applied per submission queue of the plurality of submission queues. The fetching and the sending is applied per virtual function or physical function of a host device. The shutdown notification is an indication of a shutdown of the data storage device or a connection between the data storage device and a host device.

In another embodiment, a data storage device includes a memory device and a controller coupled to the memory device. The controller includes a PCIe interface, a control path coupled to the PCIe interface, where the control path is configured to fetch one or more command identifiers from a submission queue, wherein each command identifier is associated with a command located in the submission queue, a data path coupled to the memory device, the control path, and the PCIe interface, and a multiplexer (mux) coupled to the control path and the data path, where the controller is configured to send a completion message with an error indication for each of the one or more command identifiers to a completion queue.

The controller further comprises a completion finite state machine (FSM) coupled to the mux. The completion FSM is configured to generate the error indication and send the completion message to a host device. The completion FSM is further configured to generate a second error indication for a command whose data has been transferred to the PCIe interface from the host device, where the second error indication indicates that the command cannot be completed, and send the second error indication to the host device. The second error indication and the error indication are similar. The controller is further configured, in the control path, to fetch commands from a host device, allocate resources for the fetched commands, process the fetched commands, generate instructions for the fetched commands to the data path, and trigger the data path. After triggering the data path, the controller is configured to receive a shutdown notification and, after receiving the shutdown notification, fetch a command identifier for each command pending in the submission queue. The shutdown notification is data storage device generated or received from a host device. Fetching the one or more command identifiers includes fetching the command identifier for all pending commands in the submission queue.

In another embodiment, a data storage device includes memory means and a controller coupled to the memory means. The controller is configured to fetch a command identifier of a pending command in a submission queue, where the fetching is in response to a shutdown notification, and where data of the pending command is not fetched, and generate and send an error indication for the pending command.

The submission queue includes a plurality of submission queues. The controller is further configured to isolate one or more submission queues from the plurality of submission queues and perform the fetching, generating, and sending to the isolated one or more submission queues. The shutdown notification is an indication that the submission queue is not relevant.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a processor coupled to the memory device, wherein the processor comprises a command fetching unit and a completion finite state machine (FSM), and is configured to:
  receive a shutdown notification;
  fetch, using a command fetching unit, one or more command identifiers from a submission queue, wherein each command identifier is associated with a command located in the submission queue; and send, using a completion FSM, a completion message with an error indication for each of the one or more command identifiers to a completion queue.

2. The data storage device of claim 1, wherein the error indication indicates that commands associated the one or more command identifiers are not completed.

3. The data storage device of claim 1, wherein the processor further includes a multiplexer (mux), wherein the mux is configured to indicate to the completion FSM the one or more command identifiers associated with a command located in the submission queue.

4. The data storage device of claim 3, wherein the processor further includes:
a PCIe interface, wherein the PCIe interface, the completion FSM, and the command fetching unit operates autonomously to fetch and generate error indications for each command of the submission queue.

5. The data storage device of claim 4, wherein the processor is further configured to program data to the memory device in parallel with the operating.

6. The data storage device of claim 1, wherein the submission queue comprises a plurality of submission queues.

7. The data storage device of claim 6, wherein the shutdown notification is received for one or more of the plurality of submission queues.

8. The data storage device of claim 7, wherein the fetching and the sending is applied per submission queue of the plurality of submission queues.

9. The data storage device of claim 1, wherein the fetching and the sending is applied per virtual function or physical function of a host device.

10. The data storage device of claim 1, wherein the shutdown notification is an indication of a shutdown of the data storage device or a connection between the data storage device and a host device.

* * * * *